United States Patent [19]

Anderson et al.

[11] 4,077,020
[45] Feb. 28, 1978

[54] PULSED GAS LASER

[75] Inventors: Louis W. Anderson; William A. Fitzsimmons, both of Madison, Wis.

[73] Assignee: Wisconsin Alumni Research Foundation, Madison, Wis.

[21] Appl. No.: 579,268

[22] Filed: May 20, 1975

[51] Int. Cl.$^2$ .............................................. H01S 3/097
[52] U.S. Cl. ............................ 331/94.5 PE; 313/217; 313/231
[58] Field of Search .................... 331/94.5; 330/4.3; 313/214, 217, 231.4, 231

[56] References Cited

U.S. PATENT DOCUMENTS

| | | | |
|---|---|---|---|
| 3,571,745 | 3/1971 | Altman et al. | 331/94.5 PE |
| 3,577,096 | 5/1971 | Bridges et al. | 331/94.5 PE |
| 3,757,246 | 9/1973 | Basting | 331/94.5 PE |
| 3,772,610 | 11/1973 | Foster et al. | 331/94.5 PE |
| 3,821,664 | 6/1974 | Godard et al. | 331/94.5 PE |
| 3,891,942 | 6/1975 | Clerc et al. | 331/94.5 G |

OTHER PUBLICATIONS

Bergmann et al., IEEE J. of Quantum Electronics, vol. QE-9, No. 8, Aug. 1973, pp. 853-854.
Basting (OP), OPTO-Electronics, 4 (1972), pp. 43-49.
Kuswa et al. (cited by Basting (OP), Rev. Sci. Instr, vol. 41, No. 10, Oct. 1970, pp. 429-430.
Levatter & Lin, Applied Physics Letters, vol. 25, No. 12, 15 Dec. 74, pp.703-705.
Aussenego et al, Physics Letters, vol. 30A, No. 9, 29 Dec. 1969, pp. 488-489.

Primary Examiner—William L. Sikes
Assistant Examiner—Marcus S. Rasco

[57] ABSTRACT

A pulsed gas laser is constituted by Blumlein circuits wherein space metal plates function both as capacitors and transmission lines coupling high frequency oscillations to a gas filled laser tube. The tube itself is formed by spaced metal side walls which function as connections to the electrodes to provide for a high frequency, high voltage discharge in the tube to cause the gas to lase. Also shown is a spark gap switch having structural features permitting a long life.

3 Claims, 10 Drawing Figures

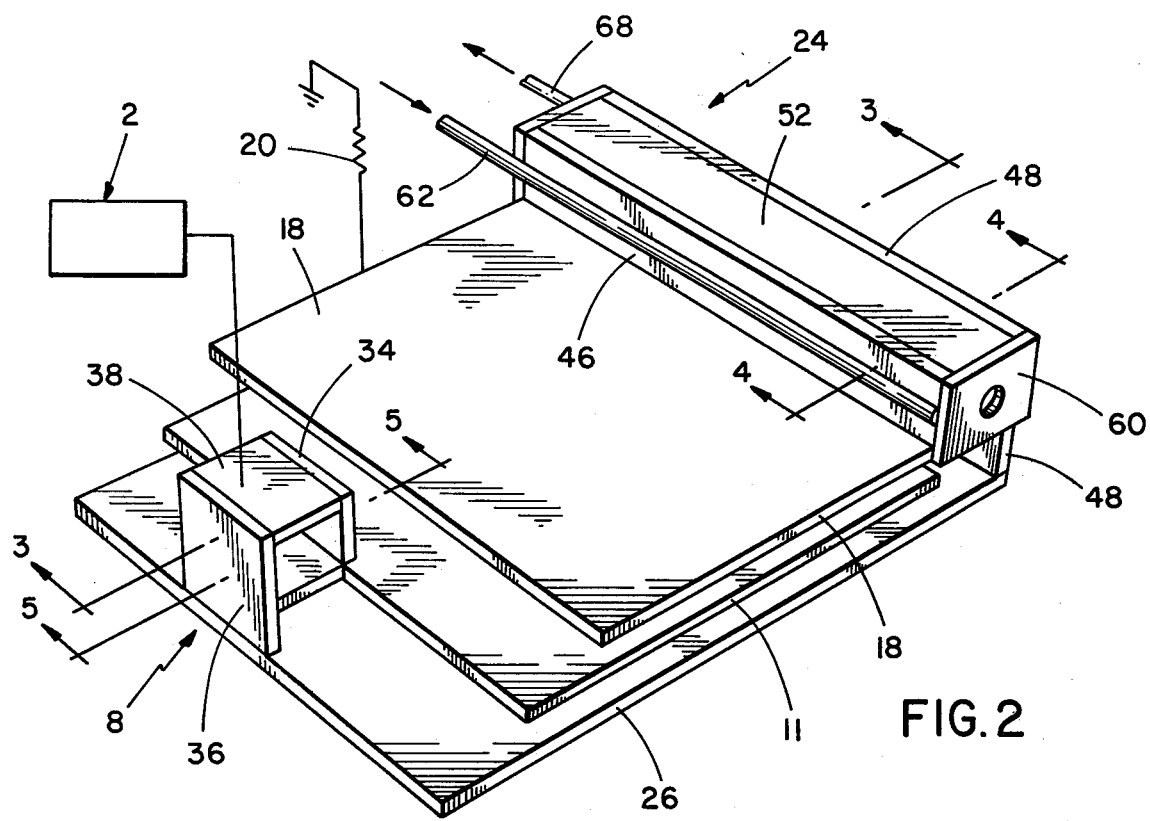
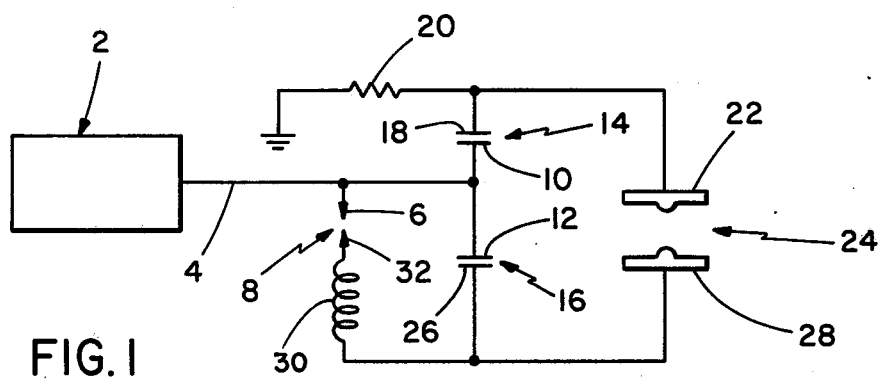
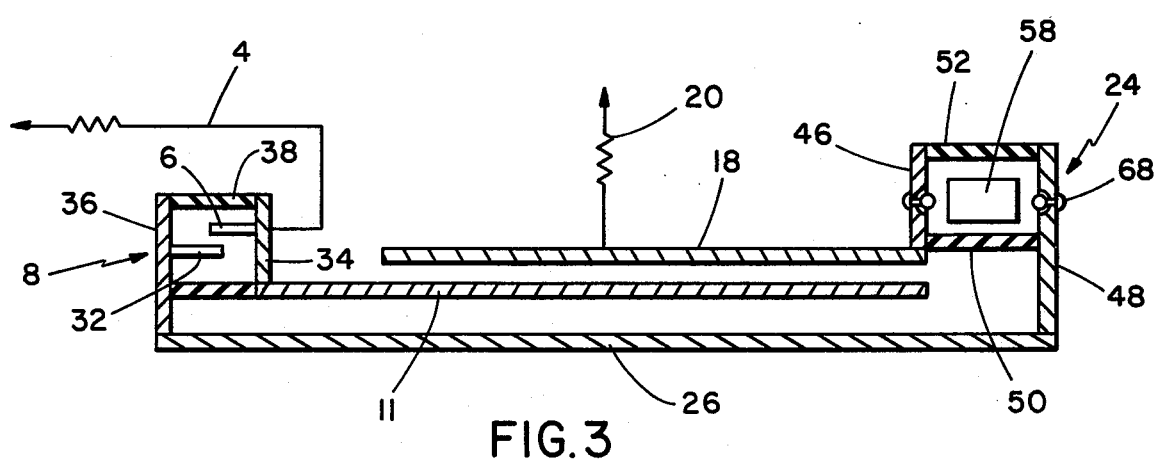

PULSED GAS LASER

The Government has rights in this invention pursuant to AEC Contract AT(11-1)-GEN-7, and Grant Nos. GP-40524 and GP-11704 and IPA No. 0001 awarded by the National Science Foundation.

BACKGROUND OF THE INVENTION

This invention relates generally to improvements in lasers. More specifically, it relates to improvements in pulsed gas lasers.

Intense lasing action in a gas such as nitrogen requires the production of a high power, high voltage pulse of electrical energy, and the delivery of this energy into a well confined volume of gas in order to produce an intense discharge in the gas. If the quantum mechanical conditions are favorable then the energetic electrons in the discharge can initiate processes that result in the selective over-population of particular excited states of the substance (so-called population inversion) producing lasing action or superradiant optical de-excitation of the excited states. Favorable conditions for lasing action require the volume of excited gas, which is to say the discharge region, be much longer in one of its dimensions as is a slender cylinder or long rectangular bar. If the above conditions are fulfilled, and the discharge is of sufficient intensity and uniformity, then intense lasing action may be expected as in the case for molecular nitrogen where lasing takes place predominately at wavelengths near 337.1 nanometers. A mirror at one end of the discharge region and a partially reflecting window at the other end will usually enhance the directionality and intensity of the laser beam. All of the above are generally well known characteristics of pulsed high power gas lasers where the required population inversion is obtained by producing an intense discharge in the gas.

However the design and construction of pulsed high power gas discharge lasers which are at the same time low in cost and of high reliability has not generally been achieved for the particular situation where the electrical voltages required are of the order of 10 kilovolts or greater and with the additional requirement that this electrical energy must be delivered into the gas in very short times that may be of the order of several nonoseconds. (One nanosecond = $10^{-9}$ sec.)

Therefore it is an object of this invention to provide a novel lasing apparatus which is both economical and reliable.

It is another object of this invention to provide novel lasing apparatus in which economical construction is achieved by utilizing various circuit elements to perform dual electrical and mechanical functions.

A particular element which may have a relatively short life when switching the high voltages required for laser operation is the switch controlling the energy flow to the laser tube. Thus such devices may have their lives shortened because concentrated high voltage arcs or sparks cause local heating on a solid surface. On succeeding operations of the switch the hot spot tends to promote the occurrence of the arc or spark at the same location resulting in pitting of the surface and consequently reduced life.

Therefore it is another object of this invention to provide an improved laser having a novel high voltage switch capable of a very large number of operations.

Another object of this invention is to provide a novel laser apparatus wherein a single switch device can be used to switch one or more than one energy storage circuits.

As stated above, it is important for lasing action that the discharge in a laser tube be of sufficient intensity and uniformity.

Consequently it is a further object of this invention to prove a novel laser tube constructed to provide a highly concentrated and uniform electrical discharge.

In addition it is an object of this invention to provide a novel laser having unique gas supply means permitting a uniform distribution of the gas over the length of the tube.

SUMMARY OF THE INVENTION

Briefly, the foregoing and other objects are achieved in embodiments of the invention wherein capacitors are provided to store electrical energy for causing a discharge in gas filled laser tubes and the plates thereof also function as transmission lines to couple the energy to the tube. A unique switch arrangement controls the flow of the energy. In other aspects of the invention the laser tube is formed in part by connections to the electrodes thereof.

BRIEF DESCRIPTION OF THE DRAWINGS

The invention itself is set forth in the claims appended hereto and forming a part of this specification while an understanding of the structure and operation of an embodiment thereof may be had by reference to the drawings in which:

FIG. 1 is a schematic diagram of the electrical circuit of an embodiment of the invention;

FIG. 2 is a perspective illustration of an embodiment of the invention;

FIG. 3 is a sectional view along the line 3—3 of FIG. 2;

DETAILED DESCRIPTION

Figure 4:
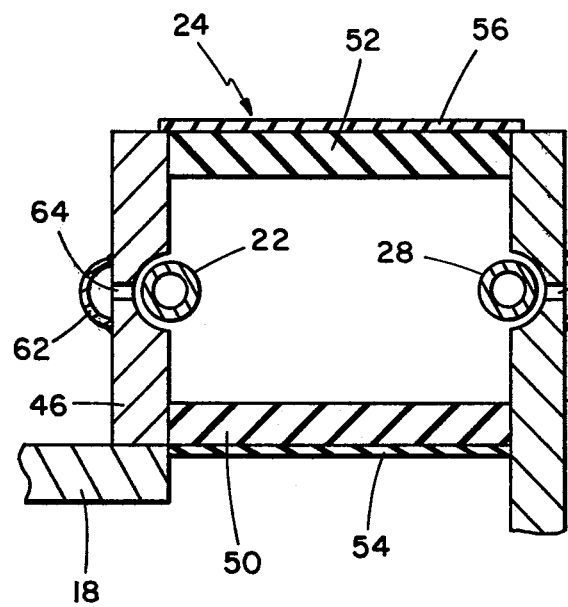
FIG. 4 is a sectional view along the line 4—4 of FIG. 2.

Referring first to FIG. 1, an embodiment of the invention is constituted by a unidirectional power supply 2 which may take any number of forms. However it has been found in practice that a half wave rectifier transformer coupled to a standard 60 Hz supply in conjunction with a suitable inductance in the transformer primary and a current limiting resistor in the secondary gives satisfactory results. Obviously variations in the design and parameters of the power supply may be made as desired by a designer.

The output 4 of the power supply is connected to one side or terminal 6 of a spark gap switch 8 and also to the junction of a pair of capacitor plates 10 and 12 of capacitors 14 and 16, respectively.

The other plate 18 of the capacitor 14 is connected to the junction of a grounded resistor 20 and one electrode 22 of a laser tube 24. The other plate 26 of the capacitor 16 is connected to the junction of another electrode 28 of the laser tube 24 and an inductor 30 connected to the other terminal 32 of the spark gap switch 8.

The two capacitors 14 and 16 are charged from the power supply to a voltage $-V$. Preferably the capacitances of each capacitor are equal to each other but this is not necessary. In any case the charging of the capacitors is effected relatively slowly and a value for resistor 20 is chosen such that capacitor 14 may become fully charged. The spacing of the electrodes and the gas pressure in spark gap switch 8 are chosen so it will spark at $-V$. When the switch 8 sparks the circuit formed by the inductor 30 and capacitor 16 begins to oscillate at a very high frequency, that is, one wherein the periodicity is preferably on the order of 10 to 100 nanoseconds.

When the oscillations begin resistor 20 and any current limiting resistor in the power supply 2 are effectively open circuits since they cannot discharge the capacitors 14 and 16 on the time scale of the oscillations. Thus voltage on the electrode 22 rises toward $+2V$ very rapidly. As the voltage across electrodes 22 and 28 rises toward 2V the gas in the tube 24 begins to conduct and is fully conducting at a voltage approaching 2V. When fully conducting there is an intense discharge in the gas which results in a population inversion and a lasing action.

FIGS. 2 through 5 illustrate a physical embodiment and reference is made to those figures in connection with the following description. In those figures elements which perform the electrical functions illustrated in FIG. 1 are given the same reference numerals.

Thus, power supply 2 has its output 4 connected to a terminal 6 of the spark gap switch 8. The switch 8 is in the form of closed construction constituted by a pair of aluminum sides 34 and 36 on which the electrodes 6 and 32, respectively, are mounted. The enclosure for the switch 8 is completed by insulated supports 38 on the ends and sides.

The switch must be capable of repetitively switching voltages in the neighborhood of 20,000 volts or greater and conducting currents on the order of 20,000 to 40,000 amperes or more. These requirements mean that considerable energy is dissipated in the switch, more specifically on the surfaces of the switch electrodes.

In the normal operation of spark gap switches the arc or spark between the electrodes is very intense and small in diameter. Thus considerable energy is applied to a small area of the electrodes resulting in local heating. A "hot spot" so caused tends to promote succeeding sparks at the same location, thus resulting in pitting of the electrodes and a reduction in its useful life. Also the high temperatures at the hot spot result in sputtering of electrode material onto insulating surfaces and eventually the formation of a conducting surface between the electrodes and consequently a shorting out of the switch.

In order to eliminate or considerably reduce the effect of these problems the electrodes are formed from a good heat conduction material such as copper and are water cooled. In addition the electrodes are formed as rather large elements (compared to the space between them) having extensive confronting flat surfaces. The high thermal conductivity of the electrodes and the water cooling prevents the surface material at the location of a spark from becoming excessively hot so that only a very small amount of material will be sputtered away and increasing the possibility that the next spark will occur at a different location. Because the electrodes are flat and large compared with the space between them, whatever material is sputtered has its greatest possibility of being deposited on the electrodes rather than on a surrounding wall. The redeposition of the sputtered material onto the electrodes themselves also offers the advantage of maintaining the spacing between them and thus consistent electrical performance of the switch.

Figure 5:
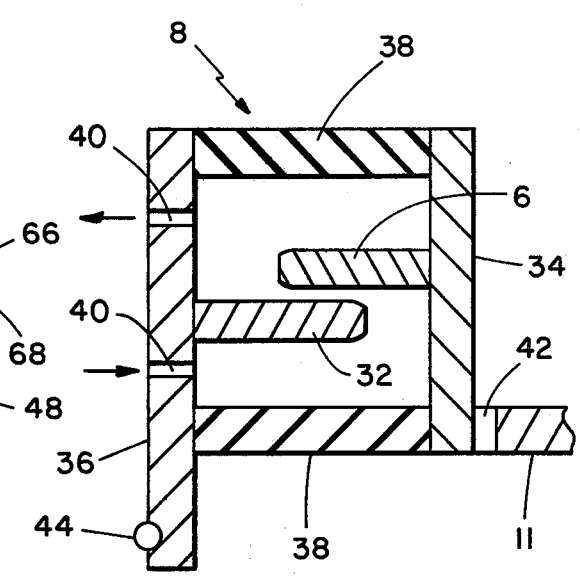
FIG. 5 is a sectional view along the line 5—5 of FIG. 2.

As may be seen in FIG. 5, the electrodes 6 and 32 are large compared to the spacing between them. Also their overlapping confronting surface are relatively large in the same respect so the above noted advantages are achieved.

Means are provided to maintain the switch enclosure filled with an inert gas by providing ports 40 in the side plate 36 for the entry and exit of such a gas from a suitable supply. Water cooling is provided for the side plate 34 by a duct 42 mounted between that side plate and capacitor plate 11. Water cooling of the side plate 36 is provided by mounting on that plate, in any suitable fashion, a conduit 44.

As will be described in greater detail hereinafter, the capacitors 14 and 16 are formed by the plates 18, 11 and 26 connected as shown between the switch 8 and laser tube 24. Insulation means is provided between the plate to space them apart.

In accordance with the invention the plates 18, 11 and 26 function as the plates of the capacitors and also transmission lines coupling the output of the oscillator to the laser tube. Thus the plate 18 is connected to the electrode 22 by virtue of a connection between it and a side wall 46 of the tube 24. The side wall is preferably formed of aluminum both for its thermal and electrical conducting properties while an opposite side wall 48 is formed of the same material and is connected to the plate 26. The tube 24 is completed by strips of insulating material 50 and 52, such as plexiglass, separating the side walls 46 and 48 and forming the top and bottom of the tube. The resistance 20 is constituted by sheets of resistive material 54 and 56 connecting the side walls 48 and 52. Mounted on one of the tubes is a mirror 58 and on the other end a window 60 for the collection and transmission of the radiant energy.

The electrodes 22 and 28 themselves are formed by "ridges" running substantially the length of the tube and consist of hollow copper tubing pressed into recesses in the side walls. Each copper tube enters and exits its respective side wall through leak proof means and are connected to a water supply source whereby they may carry water for cooling purposes. The gas to be lased is supplied to the tube through a manifold 62 running the length of the tube 24 and connecting with openings 64 in the side wall 46 which extend through that wall and open behind the ridge or electrode 22. The gas exits through similar openings 66 in the side wall 48 into a manifold 68.

The ridges or electrodes 22 and 26 function to concentrate the discharge near the center of the tube as do the resistive elements 54 and 56 which establish a uniform potential gradient within the tube. Because the discharge is concentrated the voltage necessary for lasing action is thereby reduced.

A particular advantage derived by the gas flow arrangement is that the gas enters the tube uniformly over its length. It also permits gas to enter at the positive electrode and to flow toward the negative electrode. In a pulsed gas laser it is desirable to leave distributed residual ionization from a first discharge in order to properly or more easily initiate the next discharge in the gas. The distribution is achieved by the sheet of gas running the length of the tube and issuing from the openings around the positive electrode. The amount of residual ionization is determined by the flow rate. Further by flowing the gas from the positive toward the negative electrode advantage is taken of the greater mobility of the negative ions and their ability to be accelerated more easily by electric fields. That is, after a discharge the negative ions in the residual ionization are better positioned to be pulled back to the positive electrode and start a new discharge.

It is desirable to maintain the spacing between the capacitor uniform and hold the insulation firmly. The first requirement arises because of the need to obtain a uniform discharge along the length of the laser tube, while the second because repetitive electrical and mechanical stresses on the insulation will result in premature failure.

Figure 8:
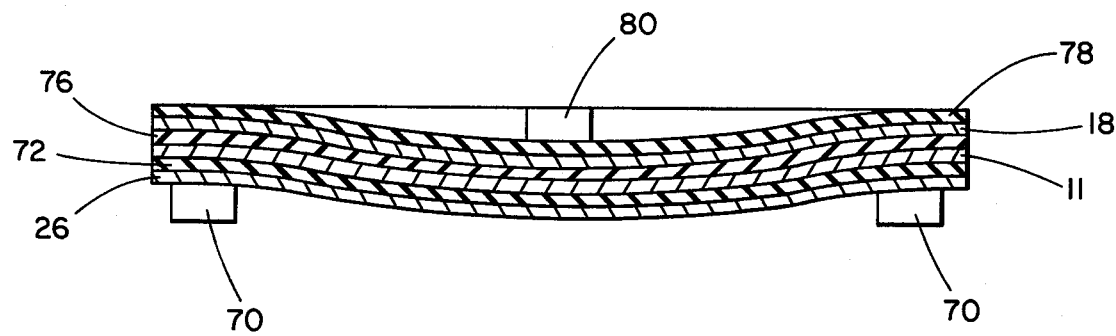
FIG. 8 is a side view partially in section of the capacitor plates of the first embodiment illustrating how they may be retained in a desired position.
Figure 9:
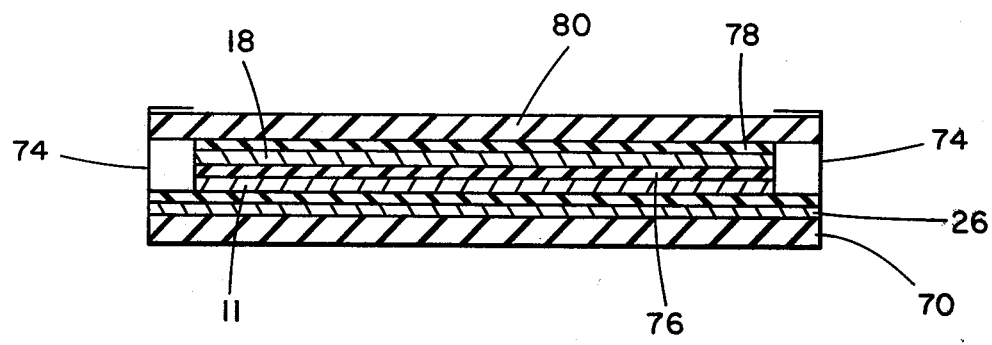
FIG. 9 is an end of the assembly shown in FIG. 8.

In this invention these needs are met by deforming or stretching the plates while at the same time pressing them together. As may be seen in FIGS. 8 and 9 the plates and their interposed insulation are a stretched alternately over and under fixed supporting members. Thus reference numeral 70 designates lower press bars supported on a fixed surface and attached in any suitable manner as by screws to the bottom plate 26. A layer of insulation, for instance a mylar sheet 72, is disposed on top of the plate 26 and mounted on the top of that are a pair of spaced channel members 74 with their flanges confronting each other. The plate 11, which is not as wide as the plate 26 rests on the insulating sheet 72 and on top of that is another insulating sheet 76. The plate 18 is above insulating the sheet 76 and another insulating sheet 78 is atop the plate 18. Upper press bars 80 are forced under the upper flanges of channels 74 and are then screwed to the top plate 18 whereby the plates are stretched and deformed as described. By virtue of this construction relatively thin material can be used for the capacitor plates and they are held firmly together with uniform spacing provided by the insulating sheets.

Figure 6:
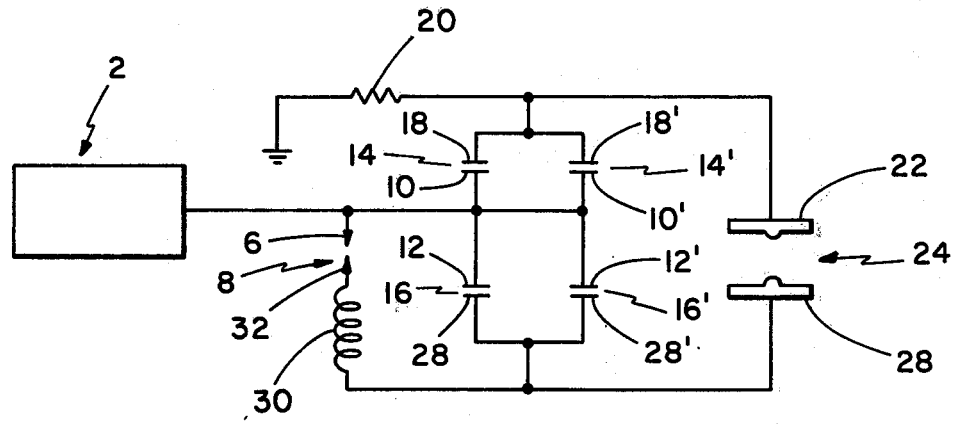
FIG. 6 is a schematic diagram of the electrical circuit of an alternative embodiment of the invention.
Figure 7:
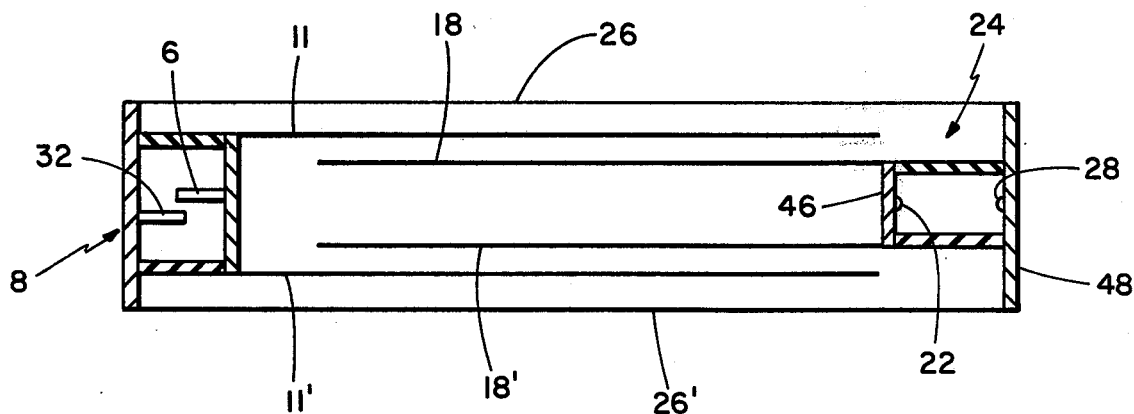
FIG. 7 is a diagrammatic illustration of physical arrangement of the embodiment illustrated schematically in FIG. 6.
Figure 10:
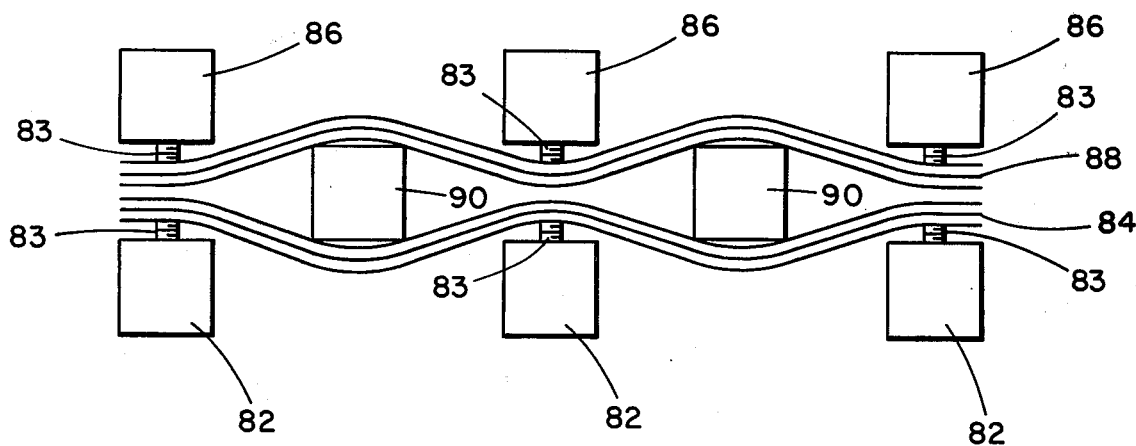
FIG. 10 is a side of the capacitor assembly of FIG. 6 illustrating how the assembly may be held in a position.

In the event it is desired to increase the energy capability of a laser in accordance with the invention a multiple Blumlein circuit can be used. This is illustrated in FIGS. 6, 7 and 10. In these figures those elements which correspond to elements in the previously described embodiment had been given the same reference numerals, and those which are similar in purpose and construction have been designated by the use of "prime" numbers.

Thus in FIG. 6 it can be seen that a second pair of capacitors 14' and 16' are connected in parallel with the capacitors 14 and 16, permitting a larger amount of electrical energy to be stored and subsequently discharged to the tube 24.

FIG. 7 illustrates how the embodiment illustrated schematically in FIG. 6 can be physically constructed. Inasmuch as the tube and switch construction have been described previously, that description will not be repeated. But as may be seen, switch electrode 6 is connected to capacitor plates 11 and 11', while switch electrode 32 is connected to capacitor plates 26 and 26', which in turn are connected to tube side wall 48. Tube side wall 46 is connected to capacitor plates 18 and 18'. Thus, in this arrangement two pairs of capacitors are connected between the switch 8 and tube 24 to function as energy storage devices and transmission lines.

In FIG. 10 there is generally a means stretching and holding firm the double Blumlein circuitry of FIGS. 6 and 7. Thus lower press bars 82 support the bottom capacitor plate 26' of a lower capacitor assembly 84 while upper press bars 86 bear on an upper capacitor assembly 88. The two sets of capacitors are separated by brace or spacer bars 90. The press bars may be screwed into a capacitor plate as shown in a schematic way at 83 for instance. Thus the construction illustrated presses the plates and the insulating sheets of each capacitor assembly together.

A number of specific construction details have been disclosed; however it is obvious that it is possible to use various other design and detail approaches without departing from the inventive concept and it is intended by the claims appended hereto to cover all variations which come within their scope.

What is claimed as new and desired to be secured by Letters Patent is:

1. In a lasing apparatus comprising a sealed laser tube having opposite spaced electrodes thereon, a switch for controlling the flow of electrical energy to said tube, and coupling means connected between said tube and said switch for coupling electrical energy from said switch to said tube, the improvement wherein each said electrode comprises an arcuate shaped elongated element mounted on opposite sides of said tube on the interior walls thereof, a gas inlet manifold coextensive with one of said electrodes along the outside of a first wall of said tube, a gas exhaust manifold coextensive with the other of said electrodes mounted along the outside of a second wall of said tube, each of said tube walls having openings extending therethrough from its associated manifold to the interior of said tube and wherein said switch comprises a sealed enclosure, a first flat electrode mounted on an interior wall of said enclosure and extending therefrom, a second flat electrode mounted on another interior wall of said enclosure and extending therefrom said first electrode and having a portion spaced a slight distance therefrom, side switch electrodes overlapping each other and wherein said switch electrodes are large compared to the distance between them and the area of overlap is great compared to the same distance.

2. In a lasing apparatus comprising a sealed laser tube having opposite spaced electrodes thereon, a switch for controlling the flow of electrical energy to the tube, and coupling means connected between the said tube and said switch for coupling electrical energy from said switch to said tube, the improvement wherein each said electrode comprises an arcuate shaped elongated element mounted on opposite sides of said tube on the interior walls thereof, a gas inlet manifold coextensive with one of said electrodes mounted along the outside of a first wall of said tube, a gas exhaust manifold coextensive with the other of said electrodes mounted along the outside of a second wall of said tube, each of said tube walls having openings extending therethrough from the associated manifold to the interior of said tube, and wherein said coupling means comprises metallic plates spaced from each other, insulating sheets coextensive with said plates and positioned therebetween, and fixed space supporting members and wherein said plates and insulating sheets are stretched alternatively over and under said supporting members.

3. The lasing apparatus of claim 25 including means for cooling said switch.

* * * * *